United States Patent [19]

Kawamoto et al.

[11] Patent Number: 4,510,817
[45] Date of Patent: Apr. 16, 1985

[54] GEAR OPERATING MECHANISM OF AN AUTOMOTIVE MANUAL TRANSMISSION

[75] Inventors: Tamio Kawamoto; Kazuyoshi Hiraiwa, both of Yokohama, Japan

[73] Assignee: Nissan Motor Company, Limited, Japan

[21] Appl. No.: 379,507

[22] Filed: May 18, 1982

[30] Foreign Application Priority Data

May 19, 1981 [JP] Japan ................................. 56-74097

[51] Int. Cl.³ .......................... G05G 5/10; G05G 9/12
[52] U.S. Cl. .................................. 74/477; 74/473 R; 74/520
[58] Field of Search ................... 74/473 R, 477, 520

[56] References Cited

U.S. PATENT DOCUMENTS

| 1,089,186 | 3/1914 | Brockman | 74/477 |
| 2,403,162 | 7/1946 | Zamean | 74/473 |
| 2,434,051 | 1/1948 | Randol | 74/477 |
| 3,319,479 | 5/1967 | Iavelli et al. | 74/333 |
| 3,636,793 | 1/1972 | Bieber | 74/473 R |
| 3,731,554 | 5/1973 | Renk | 74/477 |
| 3,949,624 | 4/1976 | Bienert | 74/520 |
| 4,022,079 | 5/1977 | Hidaka | 74/476 |
| 4,228,693 | 10/1980 | Keibel | 74/339 |
| 4,277,983 | 7/1981 | Izumi et al. | 74/473 R |
| 4,337,675 | 7/1982 | Holdeman | 74/477 |

FOREIGN PATENT DOCUMENTS

| 143580 | 9/1951 | Australia | 74/473 |
| 246892 | 8/1909 | Fed. Rep. of Germany | 74/520 |
| 1805950 | 7/1969 | Fed. Rep. of Germany | 74/473 |
| 2299562 | 8/1976 | France | |
| 216621 | 6/1924 | United Kingdom | 74/473 |

Primary Examiner—Allan D. Herrmann
Attorney, Agent, or Firm—Lowe, King, price & Becker

[57] ABSTRACT

In a manual transmission having a gear which is axially slidable from its neutral position to its operating position, there is provided a gear operating mechanism which is constructed to positively prevent the undesirable "gear disengagement phenomenon". The mechanism comprises an operating lever pivotable about a first axis relative to the transmission case to move the gear between the neutral position and the operating position; a handling lever pivotable about a second axis relative to the transmission case, the second axis being parallel with the first axis; a link pivotally connecting the operating and handling levers through pivot pins so that the link is pivotable about a third axis relative to the operating lever or vice versa and the link is pivotable about a fourth axis relative to the handling lever or vice versa; and means for pivotally moving the handling lever about the second axis in response to the movement of a speed change shift lever of the transmission, wherein the operating lever, the handling lever and the link are so arranged and constructed that when they assume respective positions to cause the gear to assume the operating position, the second, third and fourth axes come into alignment with one and other.

8 Claims, 6 Drawing Figures

GEAR OPERATING MECHANISM OF AN AUTOMOTIVE MANUAL TRANSMISSION

BACKGROUND OF THE INVENTION

1. Field of the Invention

The present invention relates in general to an automotive selected gear sliding type manual transmission, and more particularly to a gear operating mechanism of the transmission, which has means for positively preventing the undesirable gear disengagement phenomenon.

2. Description of the Prior Art

In a manual transmission of a selected gear sliding type, a so-called "gear disengagement" sometimes happens particularly in a long-used transmission. The gear disengagement is an undesirable phenomenon in which the gear assuming its operating or engaged position suddenly and unexpectedly disengages from the associated gears, thereby suddenly breaking the power transmitting connection between the engine and the driven road wheels. In order to solve such undesirable phenomenon, various measures have been hitherto proposed. However, some of them have been made at the sacrifice of handling comfortableness and production cost of the transmission.

SUMMARY OF THE INVENTION

Therefore, it is an essential object of the present invention to provide a gear operating mechanism of an automotive selected gear sliding type manual transmission, which positively prevents the undesired "gear disengagement".

According to the present invention, there is provided, in a selected gear sliding type manual transmission having a gear which is axially slidable from its neutral position where it disengages from the associated gears to its operating position where it engages with the associated gears, a gear operating mechanism which comprises a first lever pivotally movable about a first axis relative to a case of the transmission to move the gear between the neutral position and the operating position, a second lever pivotally movable about a second axis relative to the transmission case, the second axis being parallel with the first axis, a third lever having one end pivotally connected to the first lever and the other end pivotally connected to the second lever, so that the third lever is pivotally movable about a third axis relative to the first lever or vice versa and the third lever is pivotally movable about a fourth axis relative to the second lever or vice versa, and means for pivotally moving the second lever about the second axis in response to the movement of a speed change shift lever of the transmission, wherein the first, second and third levers are so arranged and constructed that, with the gear assuming the operating position, a force is applied to said gear to urge the same in a direction from the operating position to the neutral position, at least a part of the force is received by the transmission case through the first, second and third levers.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In order to facilitate the explanation of the invention, the following description will be made with respect to a reverse gear operating mechanism which is associated with a fifth speed synchronizing clutch mechanism. However, the present invention is not limited to such reverse gear operating mechanism, but applicable widely to any mechanism so long as it includes an axially slidable gear for effecting a predetermined gear ratio.

Figure 1:
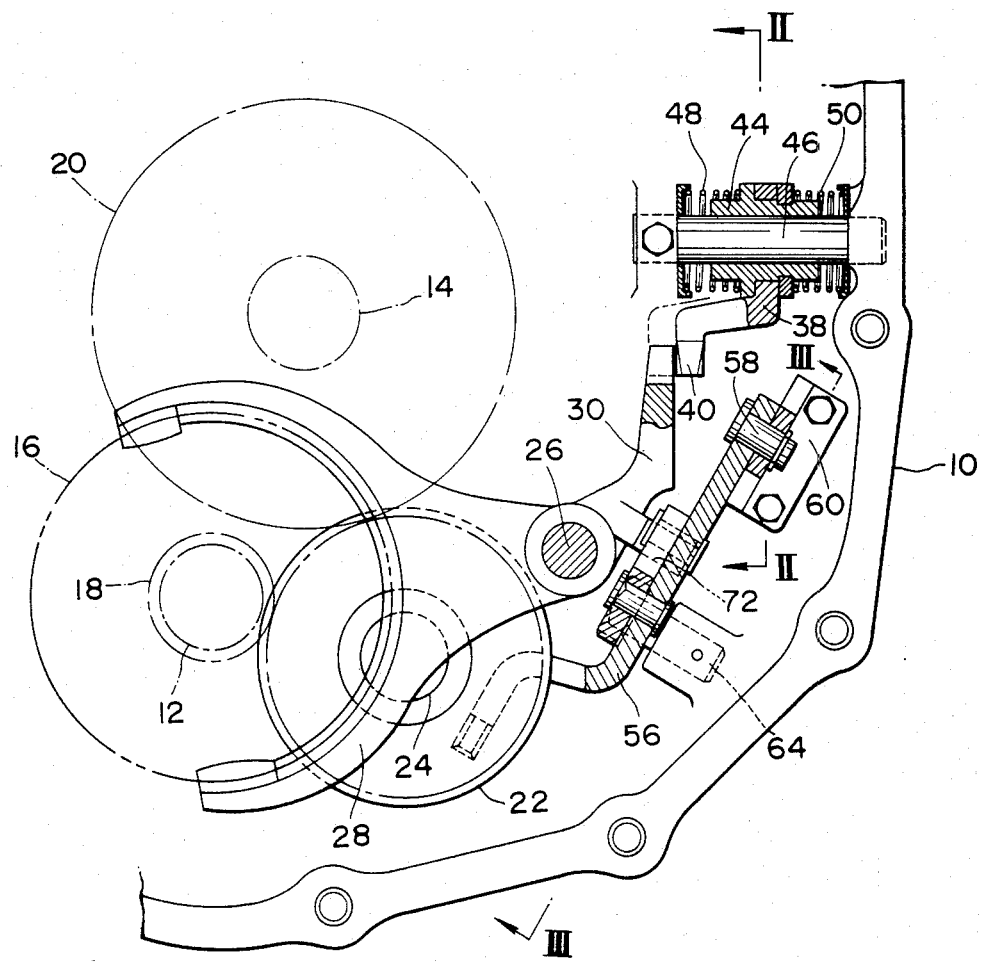
FIG. 1 is a laterally sectioned view of an automotive manual transmission of a selected gear sliding type, which is equipped with a reverse gear operating mechanism embodying the present invention.

Referring to FIGS. 1 to 4, especially FIG. 1, there is shown a part of an automotive manual transmission, where a reverse gear operating mechanism according to the present invention is arranged. Within a case 10 of the transmission, there are parallel input and output shafts 12 and 14 which are rotatable about the respective axes thereof relative to the case 10. Denoted by numeral 16 is a coupling sleeve of a fifth speed synchronizing clutch mechanism. This mechanism is mounted about the input shaft 12 for smoothly connecting a fifth speed input gear (which is journalled on the input shaft 12 and constantly meshed with a fifth speed output gear securely mounted on the output shaft 14) to the input shaft 12 thereby to smoothly establish the fifth speed gear ratio. A reverse input gear 18 is securely mounted on the input shaft 12 to rotate therewith, while a reverse output gear 20 is secured to the output shaft 14 at a position near the reverse input gear 18. A reverse idler gear 22 is rotatably and axially slidably disposed on a stationary shaft 24 which extends in parallel with the input and output shafts 12 and 14. The reverse idler gear 22 is movable on the shaft 24 from an operating position where it meshes with both the reverse input gear 18 and the reverse output gear 20 to an inoperative or neutral position where it disengages from them. Thus, under the operating condition of the idler gear 22, the reverse input gear 18 and the reverse output gear 20 rotate together.

Denoted by numeral 26 is a fork shaft which extends parallel with the input and output shafts 12 and 14 and is movable axially relative to the transmission case 10. A shift fork 28 is secured at its hub section to the fork shaft 26 to move therewith. The shift fork 28 has a bifurcated arm portion which holds the coupling sleeve 16.

Figure 2:
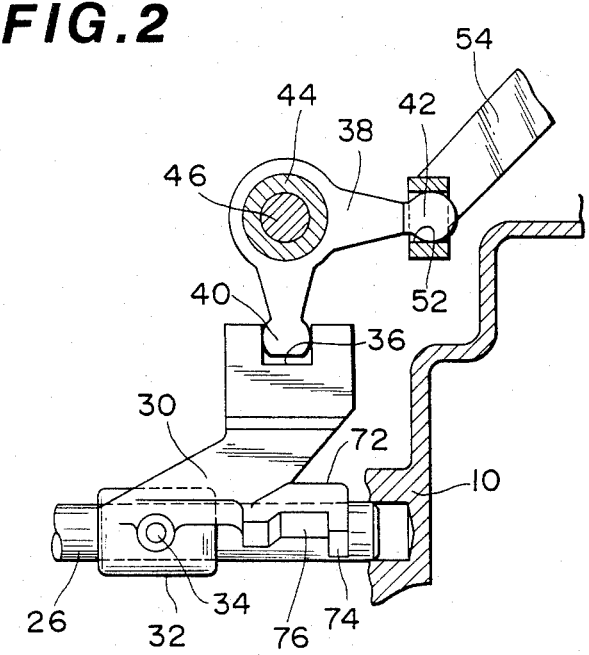
FIG. 2 is a view taken on the line II—II of FIG. 1, with some parts being not shown for clarification of the drawing.

As is shown by FIGS. 1 and 2, a shift arm 30 is also secured at its hub section 32 to the fork shaft 26 by means of a pin 34. As is seen from FIG. 2, the leading end of the shift arm 30 is formed with a recess 36 into which a portion of a next-mentioned pivoting lever 38 is insertable.

The pivoting lever 38 has two arms with respective semicircular ends 40 and 42. The lever 38 is securely mounted on a sleeve 44 which is rotatably and axially slidably disposed on a stationary shaft 46. Thus, the lever 38 and the sleeve 44 may be integrally formed. As is seen from FIG. 1, the shaft 46 extends perpendicular to the fork shaft 26 and is secured to the transmission case 10. First and second biasing springs 48 and 50 are mounted about the shaft 46 to put therebetween the sleeve 44 so that the sleeve 44 and thus the lever 38 are resiliently held in a balanced position. The semicircular end 40 of the lever 38 is inserted into the recess 36 of the shift arm 30 to engage therewith when the lever 38 moves on the shaft 46 to a predetermined axial position. The other semicircular end 42 of the lever 38 is slidably received in a hole 52 formed in a leading end of a speed change arm 54.

In accordance with the present invention, there is provided an operating lever or first lever 56 in order to axially move the idler gear 22 on the shaft 24. As is understood from FIGS. 1 and 3, one end of the operating lever 56 is pivotally connected through a pivoting pin 58 to a bracket 60 bolted to the transmission case 10, so that the operating lever 56 is movable over an imaginary plane which is parallel with the axis of the idler gear shaft 24. As is seen from FIG. 3, the other end of the operating lever 56 is forked into two arm portions which straddle the idler gear 22 to hold the same.

Figure 3:
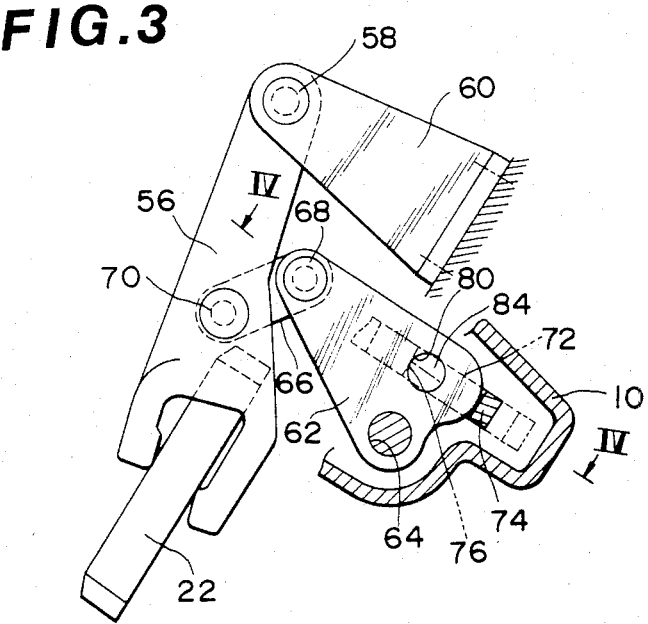
FIG. 3 is a view taken on the line III—III of FIG. 1, with some parts being not shown for clarification of the drawing.
Figure 4:
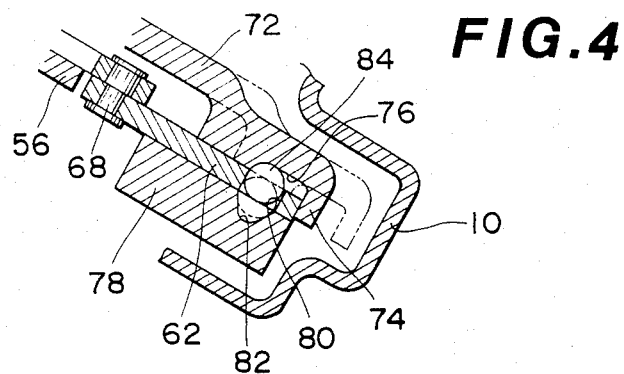
FIG. 4 is a sectional view taken along the line IV—IV of FIG. 3.

In accordance with the present invention, there is further provided a handling lever or second lever 62 of triangular shape, as is best seen in FIG. 3. As is understood from FIG. 4, the handling lever 62 lies on a common plane on which the operating lever 56 lies. The base portion of the handling lever 62 is journalled on a shaft 64. As is seen from FIG. 1, the shaft 64 extends parallel with the pivoting pin 58 and is secured to the transmission case 10. As is shown by FIG. 3, the leading end of the handling lever 62 and the generally middle portion of the operating lever 56 are pivotally connected through a link or third lever 66. For this pivotal link connection, pivoting pins 68 and 70 are used. With this arrangement, it will be appreciated that the pivotal movement of the handling lever 62 about the shaft 64 induces the pivotal movement of the operating lever 56 about the pin 58 thereby shifting the idler gear 22 from the neutral position to the operating position or vice versa. By the reason which will become clear as the description proceeds, the parts 56, 66 and 62 are so arranged that when they assume respective positions to cause the idler gear 22 to assume the operating position, the center of the pin 70, the center of the other pin 68 and the center of the shaft 64 come into alignment with one and other.

As is seen from FIGS. 1 and 2, the shift arm 30 is formed at the hub section 32 with an operating armature 72 which extends along the fork shaft 26. As is seen from FIG. 3, the operating armature 72 is arranged on the same side of the handling lever 62 as that where the link 66 is arranged. The operating armature 72 is slidably engageable with the handling lever 62 and has a pawl 74 which extends perpendicular with respect to the fork shaft 26. The pawl 74 is engageable with a curved peripheral portion of the handling lever 62 to pivotally move the same about the shaft 64. As is seen from FIG. 4, the operating armature 72 is formed with a recess 76 which faces the major flat portion of the handling lever 62. On the opposite side of the handling lever 62, there is arranged a stationary block 78 having a flat surface on which the handling lever 62 is slidably supported. Although not shown in the drawings, the stationary block 78 is securely connected to the transmission case 10 by a suitable bracket or the like. As is understood from FIGS. 3 and 4, the handling lever 62 is formed with a through hole 80 which is merged with the recess 76 of the operating armature 72, and similar to this, the stationary block 78 is formed with a recess 82 which is merged with the through hole 80 when the handling lever 62 assumes a predetermined position. A ball 84 is slidably received in the through hole 80 with a portion thereof projecting into the recess 76 or the recess 82.

In the following, operation of the invention will be described with reference to the drawings. For ease with which the description is made, the description will be commenced with respect to a neutral condition wherein neither of the fifth forward gear ratio and the reverse are established. FIGS. 1 to 4 show such a neutral condition.

When, now, the driver effects a select operation to move the shift lever (not shown) to a temporary position ready for the fifth forward gear or the reverse, the speed change arm 54 (see FIG. 2) is moved in a direction to axially move the pivoting lever 38 on the shaft 46 to the position indicated by a phantom line in FIG. 1. With this movement, the semicircular end 40 of the pivoting lever 38 is brought into engagement with the recess 36 of the shift arm 30 as shown by FIG. 2. When, then, the driver effects a shift operation to move the shift lever (not shown) to the fifth forward gear position, the speed change arm 54 is moved in a direction to cause the pivoting lever 38 to rotate in a counterclockwise direction in FIG. 2 thereby shifting the shift arm 30 and thus the fork shaft 26 rightward in the drawing. With this movement, the shift fork 28 secured to the fork shaft 26 is moved axially together with the coupling sleeve 16 to achieve the fifth forward gear ratio. During the above-mentioned shift operation, the operating armature 72 integral with the shift arm 30 is moved from a position indicated by a solid line in FIGS. 3 and 4 to another position indicated by a phantom line in the drawings, forcing the ball 84 to move into the position indicated by a phantom line in FIG. 4 where it engages with both the through hole 80 and the recess 82 thereby locking the handling lever 62 relative to the stationary block 78. Thus, the shift operation for achieving the fifth forward gear ratio is performed keeping the handling lever 62 in the position indicated by the solid line in FIGS. 3 and 4. Accordingly, during the speed change operation for the fifth forward gear ratio, the operating lever 56 linked to the locked handling lever 62 is kept stationary. Thus, the idler gear 22 keeps its neutral position.

When, after the select operation of the shift lever (not shown) to the temporary position ready for the fifth formed gear or the reverse, the driver effects a shift operation to move the shift lever (not shown) to the reverse position, the shift arm 30 and thus the fork shaft 26 are moved leftward in FIG. 2. With this movement, the shift fork 28 and thus the coupling sleeve 16 are moved in the corresponding direction to achieve the reverse condition. During this operation, the operating armature 72 integral with the shift arm 30 is moved from the position indicated by the phantom line in FIGS. 3 and 4 toward the position indicated by the solid line in the drawings (that is in a direction from a position indicated by a phantom line in FIGS. 5 and 6 to a position indicated by a solid line in these drawings). When the pawl 74 of the operating armature 72 reaches the position indicated by the solid line in FIGS. 3 and 4 and moves further in the same direction due to continuous movement of the shift lever (not shown) toward the reverse position, the pawl 74, which thus contacts the curved peripheral portion of the handling lever 62, rotates the handling lever 62 about the shaft 64 in counterclockwise direction in FIGS. 3 and 5. With this, the handling lever 62 is moved from the position indicated by the phantom line in FIGS. 5 and 6 to the position indicated by the solid line in the drawings. The movement of the handling lever 62 with the operating armature 72 picks up the ball 84 from the recess 82 of the stationary block 78 thereby permitting the ball 84 to roll on the surface of the stationary block 78 as is seen from FIG. 6. During the movement of the handling lever 62, the operating lever 56 is pivotally moved from the position indicated by a phantom line in FIG. 5 to the position indicated by a solid line in the drawing thereby shifting the idler gear 22 from its neutral position to an operating position where it engages with both the reverse input gear 18 and the reverse output gear 20. Thus, the reverse gear is established.

Figure 5:
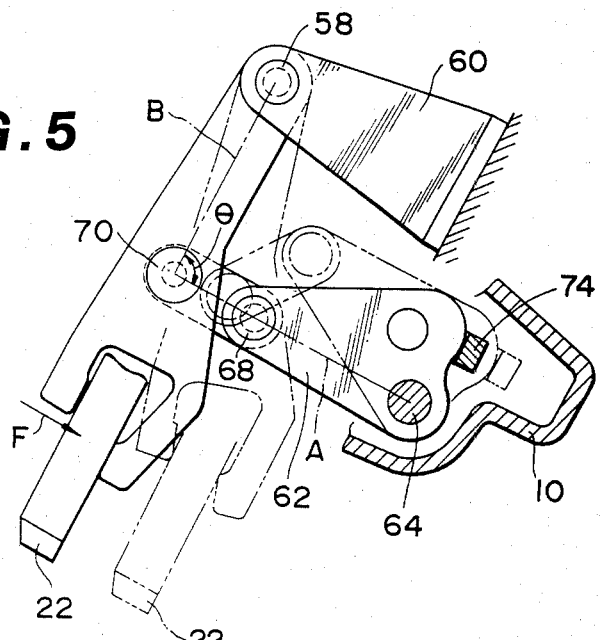
FIG. 5 is a view similar to FIG. 3, but showing a different operating condition of the mechanism.
Figure 6:
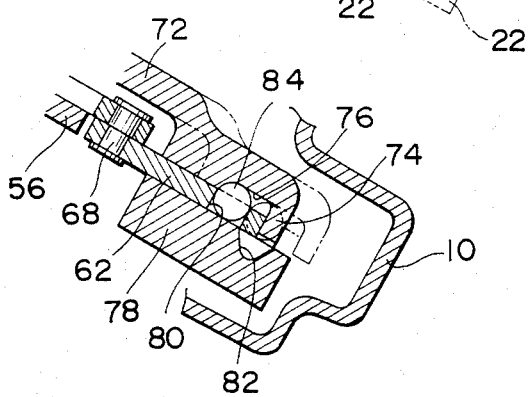
FIG. 6 is a view similar to FIG. 4, but showing a different operating condition of the mechanism.

When, then, the driver moves the shift lever (not shown) from the reverse position to the neutral position through the temporary position, the operating armature 72 is moved from the position indicated by the solid line in FIGS. 5 and 6 to the position indicated by the phantom line in the drawings, permitting the ball 84 to roll on the surface of the stationary block 78. With the ball 84 engaging both the recess 76 of the operating armature 72 and through hole 80 of the handling lever 62, the return movement of the operating armature 72 rotates the handling lever 62 in the clockwise direction in FIG. 3 thereby returning, through the operating lever 56, the idler gear 22 to the neutral position.

As is described hereinbefore, the reverse position of the idler gear 22 is effected at the time when the respective axes of the pins 68 and 70 and the axis of the shaft 64 come into alignment with one another, that is, when these axes lie on the common straight line A (see FIG. 5). Thus, when the reverse idler gear 22 at its operating condition is applied with a force F in a direction to cause the gear disengagement, at least a part of the force F is received or absorbed by the transmission case 10 through the operating lever 56, the pin 70, the link 66, the pin 68, the handling lever 62 and the shaft 64. Accordingly, the undesired gear disengagement does not occur, in accordance with the present invention.

If desired, the parts may be so arranged that, with the idler gear 22 assuming its operating position, a straight line B (see FIG. 5) passing through the centers of the pins 58 and 70 is perpendicular to the line A. According to this construction, almost all of the force F is received by the transmission case 10 through the linked parts thereby improving the gear disengagement preventing effect much more effectively.

What is claimed is:

1. In a selected gear sliding type manual transmission having a case, a speed shift gear lever, and a gear which is axially slidable from its neutral position where it disengages from the associated gears to its operating position where it engages with the associated gears, a gear operating mechanism, comprising:
    a first lever pivotally connected to said case to be pivoted about a first axis to move said gear between said neutral position and said operating position;
    a second lever pivotally connected to said case to be pivoted about a second axis which extends parallel with said first axis;
    a third lever having one end pivotally connected at a third axis to said first lever and its other end pivotally connected at a fourth axis to said second lever, so that during the pivotal movement of said first lever about said first axis said third lever pivots about said third axis and said fourth axis which are respectively arranged on said first and second levers; and
    means for pivotally moving said second lever about said second axis in response to the movement of said speed change shift lever of the transmission,
    wherein said first, second and third levers are so arranged and constructed that when they assume their respective positions to cause said gear to assume said operating position, said second, fourth and third axes are located substantially on a straight line in this order, whereas when they assume their respective positions to cause said gear to assume said neutral position, said second, fourth and third axes are located at the apexes of a predetermined triangle.

2. A gear operating mechanism as claimed in claim 1, wherein said first, second and third levers are so arranged and constructed that when they assume their respective positions to cause said gear to assume said operating position, an angle ($\theta$) defined between a first straight line which passes through then aligned second, third and fourth axes and a second straight line passes through said first and third axes is approximately 90 degrees.

3. A gear operating mechanism as claimed in claims 1 or 2, further comprising:
    locking means for locking said second lever relative to said transmission case when said first, second and third levers assume their respective positions to cause said gear to assume said neutral position.

4. A gear operating mechanism as claimed in claim 3, in which said means for pivotally moving said second lever comprises:
    an operating armature movable with a fork shaft which is axially movable to engage or disengage said gear to said associated gears to select a predetermined gear ratio, said armature having a pawl engageable with a peripheral portion of said second lever and a recess facing one side of said second lever;
    a stationary block secured to said transmission case, said block having a surface on which said second lever is slidably supported and said surface being provided with a recess at a portion facing said second lever; and
    a ball movably received in a through hole formed in said second lever, said through hole being merged with the respective recesses of said operating armature and said stationary block when said second lever assumes a predetermined position, said ball being sized so as to project into either said recess of said operating armature or said recess of said stationary block.

5. A gear operating mechanism as claimed in claim 4, in which one end of said third lever is pivotally connected to a longitudinally middle portion of said first lever.

6. A gear operating mechanism as claimed in claim 4, in which said peripheral portion of said second lever to which said pawl of said operating armature is engageable is smoothly curved.

7. A gear operating mechanism as claimed in claim 1, in which said first lever has a forked end which straddles said gear.

8. A gear operating mechanism as claimed in claim 7, in which said first lever is pivotally connected at its unforked end to a bracket secured to said transmission case.

* * * * *